United States Patent
Kolam et al.

(10) Patent No.: US 10,382,520 B2
(45) Date of Patent: *Aug. 13, 2019

(54) PLACEHOLDERS FOR DYNAMIC COMPONENTS IN HTML STREAMING

(71) Applicant: Instart Logic, Inc., Palo Alto, CA (US)

(72) Inventors: Hariharan Kolam, San Ramon, CA (US); Sharad Jaiswal, Cupertino, CA (US); Mehrdad Reshadi, Sunnyvale, CA (US)

(73) Assignee: Instart Logic, Inc., Palo Alto, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/725,954

(22) Filed: Oct. 5, 2017

(65) Prior Publication Data

US 2018/0124149 A1    May 3, 2018

Related U.S. Application Data

(63) Continuation of application No. 14/757,908, filed on Dec. 23, 2015, now Pat. No. 9,813,480.

(Continued)

(51) Int. Cl.
| | | |
|---|---|---|
| *G06F 15/16* | (2006.01) | |
| *H04L 29/08* | (2006.01) | |
| *H04L 29/06* | (2006.01) | |
| *G06F 16/958* | (2019.01) | |
| *G06F 16/957* | (2019.01) | |

(52) U.S. Cl.
CPC .......... *H04L 67/02* (2013.01); *G06F 16/9574* (2019.01); *G06F 16/972* (2019.01); *H04L 65/105* (2013.01); *H04L 65/605* (2013.01); *H04L 65/80* (2013.01); *H04L 67/2823* (2013.01); *H04L 67/2842* (2013.01); *H04L 67/2847* (2013.01); *H04L 67/32* (2013.01); *H04L 67/42* (2013.01)

(58) Field of Classification Search
CPC .......... H04L 67/02; H04L 67/2823; H04L 67/2842; H04L 67/2847; H04L 67/32; H04L 67/42; H04L 65/105; H04L 65/605; H04L 65/80; G06F 16/9574; G06F 16/972
USPC ....................................................... 709/218
See application file for complete search history.

(56) References Cited

U.S. PATENT DOCUMENTS

| | | |
|---|---|---|
| 5,680,623 A | 10/1997 | Onuma |
| 5,832,275 A | 11/1998 | Olds |

(Continued)

OTHER PUBLICATIONS

Fagni et al. 'Boosting the performance of web search engines: Caching and prefetching query results by exploiting historical usage data.' ACM Transactions on Information Systems (TOIS) 24.1 (2006): 51-78.

(Continued)

*Primary Examiner* — Wing F Chan
*Assistant Examiner* — Joseph R Maniwang
(74) *Attorney, Agent, or Firm* — Van Pelt, Yi & James LLP

(57) ABSTRACT

A method of speeding up the delivery of a dynamic webpage is disclosed. A request for a webpage is received, the webpage including one or more dynamic components. A cached stub is sent in response to the request, wherein the cached stub includes components empirically determined as static components of the webpage, and wherein the cached stub includes a placeholder replacing at least a portion of a first dynamic component of the webpage. A script is injected in the cached stub that intercepts any access to the placeholder.

20 Claims, 16 Drawing Sheets

Related U.S. Application Data

(60) Provisional application No. 62/101,134, filed on Jan. 8, 2015.

(56) References Cited

U.S. PATENT DOCUMENTS

| | | | |
|---|---|---|---|
| 6,023,586 | A | 2/2000 | Gaisford |
| 6,598,048 | B2 | 7/2003 | Carneal |
| 6,678,793 | B1 | 1/2004 | Doyle |
| 6,983,318 | B2 | 1/2006 | Doyle |
| 7,389,330 | B2 | 6/2008 | Dillon |
| 7,506,060 | B2 | 3/2009 | Anderson |
| 7,519,630 | B2 | 4/2009 | Brown |
| 7,627,479 | B2 | 12/2009 | Travieso |
| 8,522,131 | B1 | 8/2013 | Geddes |
| 8,635,339 | B2 | 1/2014 | Luna |
| 9,298,455 | B1 | 3/2016 | Kolam |
| 9,363,329 | B1 | 6/2016 | Kolam |
| 9,456,050 | B1 | 9/2016 | Lepeska |
| 10,042,948 | B2 | 8/2018 | Kolam |
| 2002/0055964 | A1 | 5/2002 | Luk |
| 2002/0062384 | A1 | 5/2002 | Tso |
| 2002/0073301 | A1 | 6/2002 | Kahle |
| 2002/0099807 | A1 | 7/2002 | Doyle |
| 2003/0001888 | A1 | 1/2003 | Power |
| 2003/0004272 | A1 | 1/2003 | Power |
| 2003/0140100 | A1 | 7/2003 | Pullara |
| 2003/0158951 | A1 | 8/2003 | Primak |
| 2003/0177175 | A1 | 9/2003 | Worley |
| 2004/0015961 | A1 | 1/2004 | Chefalas |
| 2004/0044731 | A1 | 3/2004 | Chen |
| 2004/0064682 | A1 | 4/2004 | Nguyen |
| 2004/0205165 | A1 | 10/2004 | Melamed |
| 2004/0258053 | A1 | 12/2004 | Toporek |
| 2005/0060493 | A1 | 3/2005 | Krissell |
| 2005/0188048 | A1 | 8/2005 | Yuan |
| 2005/0198309 | A1 | 9/2005 | Li |
| 2006/0031404 | A1 | 2/2006 | Kassab |
| 2006/0064467 | A1 | 3/2006 | Libby |
| 2006/0161895 | A1 | 7/2006 | Speeter |
| 2007/0101061 | A1 | 5/2007 | Baskaran |
| 2007/0162927 | A1 | 7/2007 | Ramaswamy |
| 2007/0289026 | A1 | 12/2007 | Newcombe |
| 2008/0133722 | A1 | 6/2008 | Ramasundaram |
| 2008/0208789 | A1 | 8/2008 | Almog |
| 2008/0320225 | A1 | 12/2008 | Panzer |
| 2009/0106349 | A1 | 4/2009 | Harris |
| 2009/0254707 | A1 | 10/2009 | Alstad |
| 2009/0276488 | A1 | 11/2009 | Alstad |
| 2010/0017696 | A1 | 1/2010 | Choudhary |
| 2010/0023582 | A1 | 1/2010 | Pedersen |
| 2010/0138485 | A1 | 6/2010 | Chow |
| 2011/0214111 | A1 | 9/2011 | Vidal |
| 2011/0321014 | A1 | 12/2011 | Nagoria |
| 2012/0089695 | A1 | 4/2012 | Fainberg |
| 2012/0110435 | A1 | 5/2012 | Green |
| 2012/0144126 | A1 | 6/2012 | Nimmala |
| 2012/0185835 | A1 | 7/2012 | Klots |
| 2012/0284356 | A1 | 11/2012 | Luna |
| 2012/0303697 | A1 | 11/2012 | Alstad |
| 2012/0331037 | A1 | 12/2012 | Love |
| 2013/0226992 | A1 | 8/2013 | Bapst |
| 2013/0246638 | A1 | 9/2013 | Kovvali |
| 2014/0052811 | A1 | 2/2014 | Lewin |
| 2014/0095990 | A1 | 4/2014 | Blanchard |
| 2014/0149850 | A1 | 5/2014 | Khorashadi |
| 2014/0237066 | A1 | 8/2014 | Fainberg |
| 2014/0344452 | A1 | 11/2014 | Lipstone |
| 2015/0012614 | A1 | 1/2015 | Kolam |
| 2015/0032803 | A1 | 1/2015 | Graham-Cumming |
| 2015/0263977 | A1 | 9/2015 | Nair |
| 2016/0150013 | A1 | 5/2016 | Kolam |
| 2016/0173635 | A1 | 6/2016 | Kolam |
| 2016/0246895 | A1 | 8/2016 | Kolam |
| 2017/0264701 | A1 | 9/2017 | Wei |

OTHER PUBLICATIONS

Kropfberger et al. 'A Multimedia-based Guidance System for Various Consumer Devices.' In WEBIST (2), pp. 83-90. 207.

Srinivasta et al. 'Web usage mining: Discovery and applications of usage patterns from web data.' ACM SIGKDD Explorations Newsletter 1.2 (2000): 12-23.

```
<html>
  <head>
    <title>Welcome</title>
  </head>
  <body>
    <h1>HelloWorld </h1>
         .
         .
         .
    <img src = "url for image"/>
    <video>
        <source src = "url for video" type = "video/ogg"  />
    </video>
    <script type = "text/javascript">
    <!--script
    *** Some javascript code is placed here ***
    -- >
    </script>

</body>
</html>
```

200

Script

PLACEHOLDERS FOR DYNAMIC COMPONENTS IN HTML STREAMING

CROSS REFERENCE TO OTHER APPLICATIONS

This application is a continuation of U.S. patent application Ser. No. 14/757,908, entitled PLACEHOLDERS FOR DYNAMIC COMPONENTS IN HTML STREAMING, filed Dec. 23, 2015, which claims priority to U.S. Provisional Patent Application No. 62/101,134, entitled HTML STREAMING, filed Jan. 8, 2015, both of which are incorporated herein by reference for all purposes.

BACKGROUND OF THE INVENTION

Typically, an origin server generates a webpage by integrating static and dynamic content. The wait time experienced by an end-user of a browsing session may vary from a few hundred milliseconds to as much as several seconds. Therefore, improved techniques for delivering information corresponding to a webpage would be desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
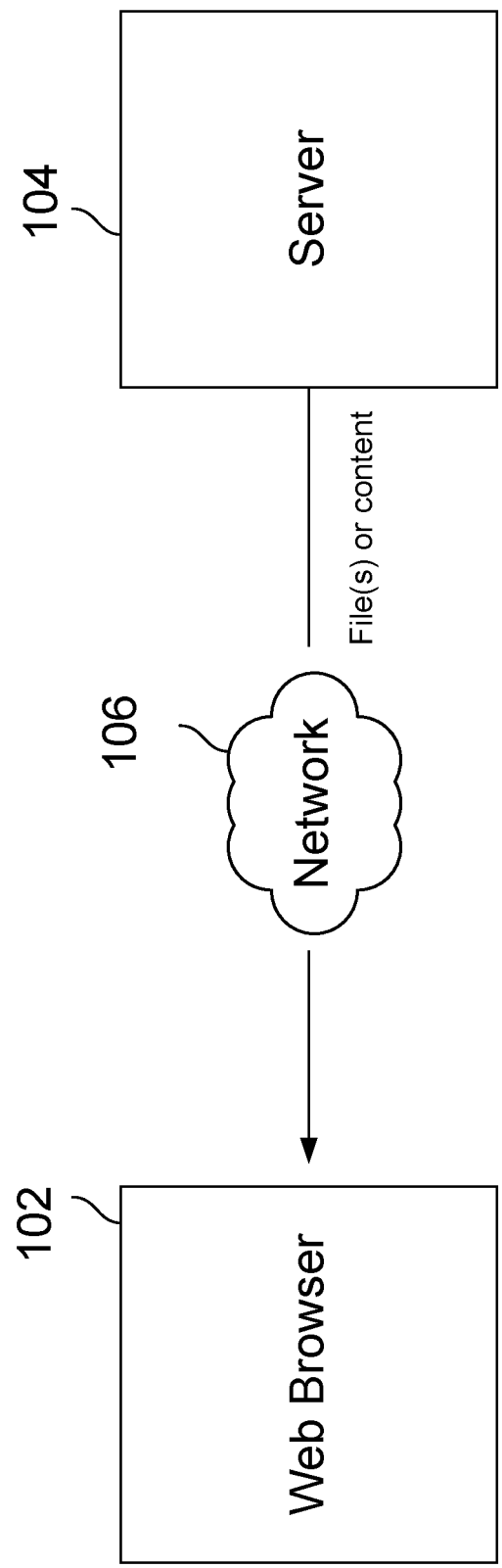
FIG. 1 is a block diagram illustrating an embodiment of a web browser running a web application.

FIG. 1 is a block diagram illustrating an embodiment of a web browser running a web application. The web browser accesses webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, for representing the various components of a webpage. The DOM is a cross-platform and language-independent convention for representing and interacting with objects in HTML documents as well as XHTML and XML documents. Objects in a DOM tree may be addressed and manipulated using methods on the objects. The public interface of a DOM is specified in its application programming interfaces (APIs), known as the DOM APIs.

The DOM standard includes different levels. DOM core level 0 and level 1 are the core standards supported by all web browsers. DOM levels 2 and above are extensions to DOM core level 0 and level 1, which can be optionally supported by different web browsers. DOM core level 0 and level 1 define a minimal set of objects and interfaces for accessing and manipulating document objects. The DOM provides a complete model for an entire HTML document, including the means to change any portion of the document.

The DOM standard represents documents as a hierarchy of node objects, called a DOM tree. Within the document structure hierarchy, some types of nodes may have child nodes of various types, while other nodes are leaf nodes that cannot have any object below them.

Figure 3:
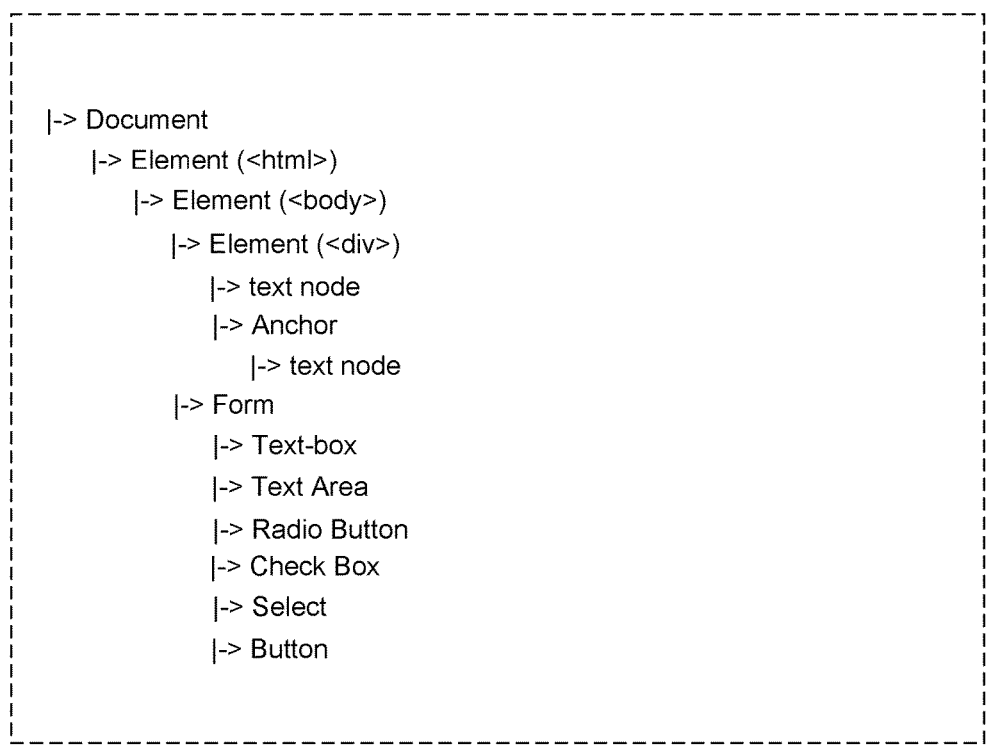
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is accordingly inserted into the DOM tree.

After the webpage file is parsed and the corresponding DOM tree is created, the entire DOM tree can be traversed to retrieve any dependent resources (e.g., images, JavaScripts, audio clips, or videos) indicated by any of the nodes in the DOM tree via a network. For example, the image object corresponding to the image tag in webpage 200 redirects web browser 102 to fetch an image file from an uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to web browser 102 via a network.

A web application may include scripts that are executed when different DOM events occur. DOM event APIs allow event-driven programming languages (e.g., JavaScript, Jscript, ECMAScript, VBScript, and Java) to register various DOM event handlers/listeners with the element nodes inside a DOM tree. Different types of events can be generated by the element nodes inside a DOM tree, including mouse events, keyboard events, HTML frame/object events, HTML form events, user interface events, mutation events, progress events, and the like. For example, the DOM event API "onclick" is triggered when a user clicks on an element, and a script that has registered as a callback script for the "onclick" event will be executed. In another example, the DOM event APIs "onKeyDown" and "onKeyup" are triggered when a user presses a key and releases a key, respectively. In another example, the DOM event API "oninput" is triggered when an element receives user inputs.

Figure 4:
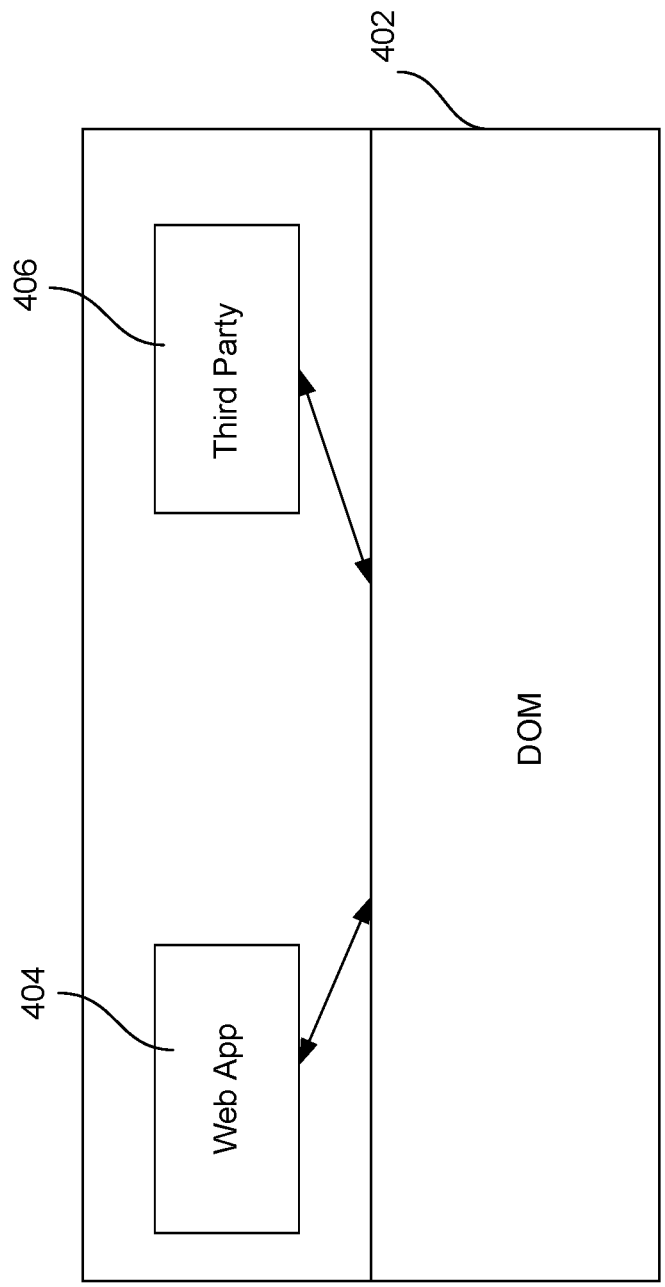
FIG. 4 illustrates that the DOM 402 may be accessed by a web application 404 and its scripts, and also by any legitimate third-party scripts, code or libraries (406).

FIG. 4 illustrates that the DOM 402 may be accessed by a web application 404 and its scripts, and also by any legitimate third-party scripts, code or libraries (406).

With continued reference to FIGS. 1 and 2, since the network latency associated with different types of networks varies widely, and web browser 102 needs to receive webpage 200 and its dependent resources before web browser 102 can complete the rendering of webpage 200, the startup wait time experienced by the end-user of the browsing session may be insignificant in low-latency networks, such as Wi-Fi or cable networks, but unacceptably long for an end-user in higher-latency networks, such as 3G networks. Traditionally, by caching content such as webpages or webpage components close to a requestor of the content, the content can be quickly retrieved from the cache rather than the origin server, saving bandwidth and time. However, caching is of limited value when the requested content is dynamic. Once the cached content has been changed, the cached content must be discarded and the updated content must be retrieved from the origin server again. As a result, when at least a portion of the content in a webpage is dynamic, the webpage is typically treated as non-cacheable, and therefore needs to be regenerated repeatedly by the origin server.

The processing time for regenerating a dynamic webpage can be long, leading to long latencies and lowered responsiveness of the website perceived by the user. For example, an origin server may be blocked by database queries to retrieve information required to generate the dynamic webpage. The processing time is dependent on the type or the amount of the information retrieved. For example, the processing time may be minimal for a simple name lookup, but long if a large block of data is fetched. Therefore, the processing time may vary from a few hundred milliseconds to several seconds. During this processing time, the web browser is idling and waiting for the HTTP response to its HTTP request, and the web browser is blocked from downloading any resources. Therefore, improved techniques for delivering information are desirable.

Although a dynamic webpage file may be dynamic and uncacheable as a whole, the webpage may include both static components and dynamic components that change over time. Static components in a dynamic page may include shared non-unique components, such as company logos and images, that stay unchanged across multiple requests sent to the origin server. Dynamic components in a dynamic webpage may include components that change over time, including news, weather forecasts, market data, and the like. Dynamic components in a dynamic webpage may also include components that are unique, customized, or personalized. A dynamic webpage may be a webpage that is generated and customized on a per-user or per-group basis. For example, when a user logs onto a social networking website (e.g., Facebook) or an online merchant website (e.g., Amazon.com), the website generates a dynamic webpage that includes static components as well as components that are in part based on the user's identity or the user's preferences and are therefore unique for each user.

Figure 5:
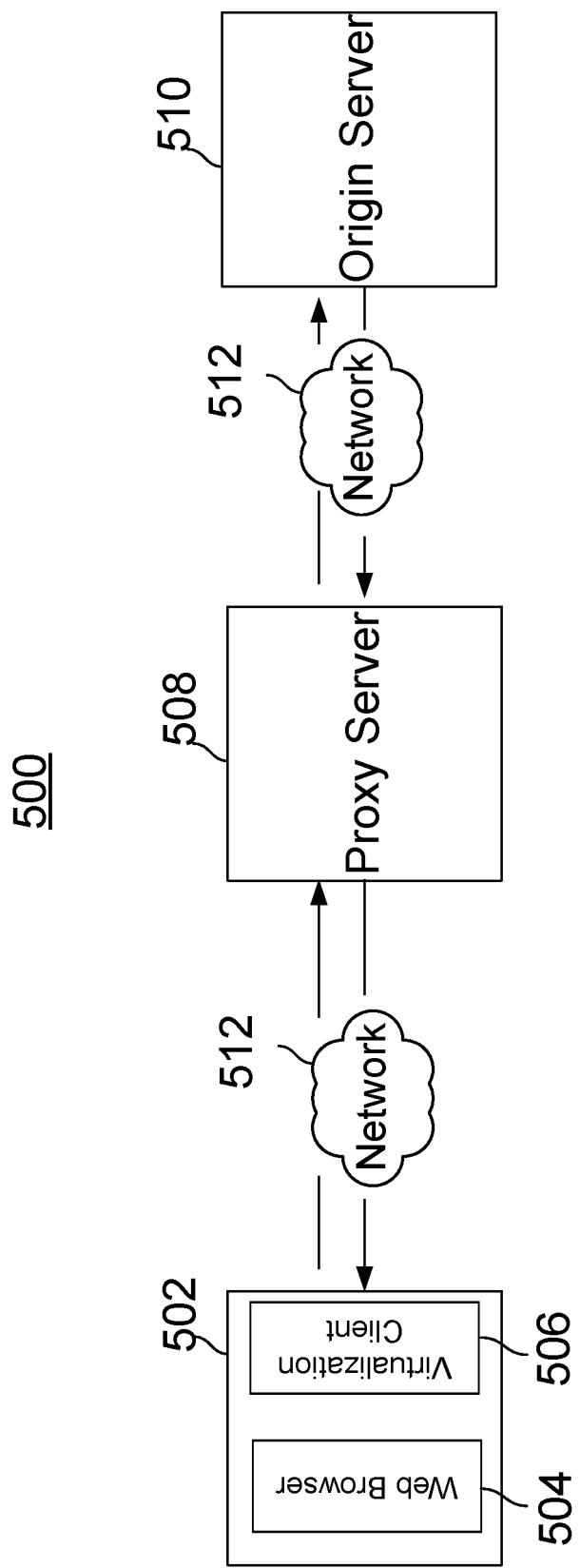
FIG. 5 is a block diagram illustrating an embodiment of an optimized content delivery environment for efficiently delivering dynamic webpages (also referred to as HTML streaming).
Figure 6:
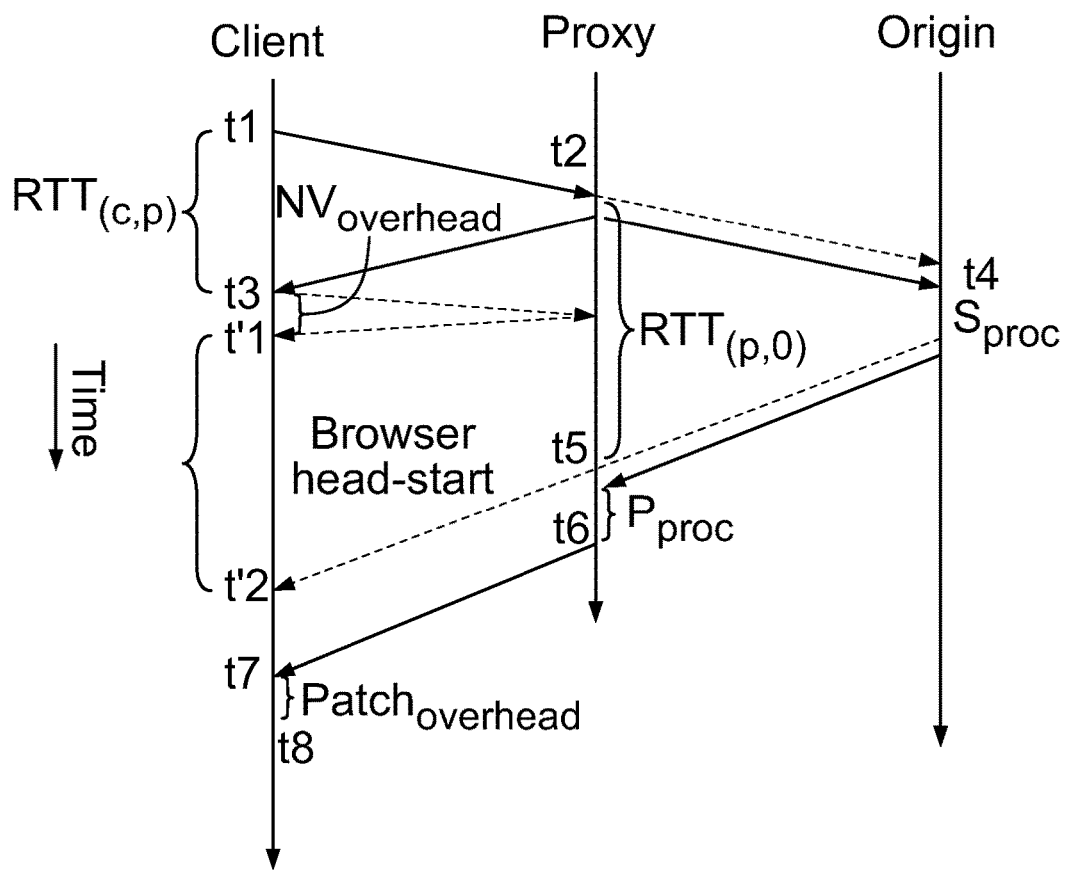
FIG. 6 is a timing diagram illustrating an exemplary sequence of requests and responses sent and received by client device 502, proxy server 508, and origin server 510.
Figure 7:
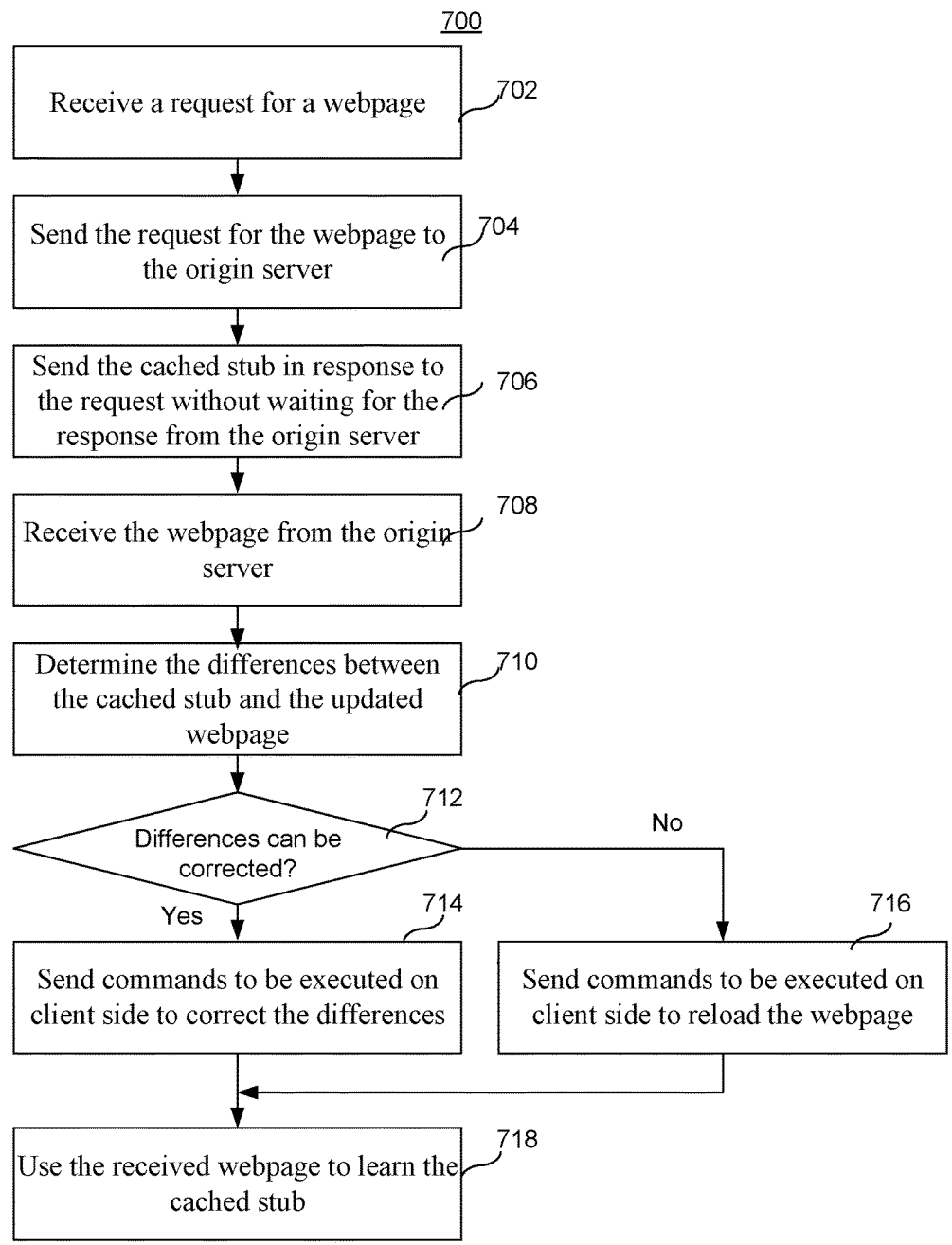
FIG. 7 is a flow diagram illustrating an embodiment of a process 700 for delivering a webpage with dynamic content.

FIG. 5 is a block diagram illustrating an embodiment of an optimized content delivery environment for efficiently delivering dynamic webpages (also referred to as HTML streaming). Block diagram 500 illustrates a client device 502, a proxy server 508, and an origin server 510 communicating across networks 512. Networks 512 may be any combination of public or private networks, including intranets, local area networks (LANs), wide area networks (WANs), radio access networks (RANs), Wi-Fi networks, the Internet, and the like. In some embodiments, proxy server 508 is a server that belongs to a content delivery network or content distribution network (CDN). Client device 502 includes a web browser 504 and a virtualization client 506. Examples of client device 502 include laptop computers, desktop computers, tablet computers, smartphones, and other mobile devices. FIG. 6 is a timing diagram illustrating an exemplary sequence of requests and responses sent and received by client device 502, proxy server 508, and origin server 510. FIG. 7 is a flow diagram illustrating an embodiment of a process 700 for delivering a webpage with dynamic content. In some embodiments, process 700 is a process running on proxy server 508 in FIG. 5.

With reference to FIGS. 5-7, at time $t_1$, web browser 504 running on client device 502 sends an HTTP request message requesting an HTML webpage. At time $t_2$ and step 702, proxy server 508 receives the HTTP request message. At step 704, after receiving the HTTP request message, proxy server 508 forwards the HTTP request message to origin server 510, querying origin server 510 for the latest version of the HTML webpage, and waits for the HTML webpage in an HTTP response message, which is expected to be sent by origin server 510 in response to the HTTP request message.

Step 706 may be performed in parallel with step 704. At step 706, without waiting for the arrival of the HTTP response message from origin server 510, proxy server 508 sends a temporary webpage (hereinafter referred to as the fast-delivery webpage) based on profiling information corresponding to the requested webpage to web browser 504. The fast-delivery webpage is a "safe," cacheable "stub" that was previously generated and cached by proxy server 508. The cached stub includes cacheable components, e.g., static and shared non-unique components, of the HTML webpage. Components include script components or other elements, such as meta elements and link elements. The cached stub generated by proxy server 508 includes information and resources that proxy server 508 predicts web browser 504 would actually receive or need to further download had the actual webpage been sent by origin server 510 and received by web browser 504. The cached stub also enables the injection of virtualization client 506 onto client device 502. Virtualization client 506 (also referred to as a nanovisor) includes a DOM virtualization layer added on top of the DOM. Virtualization of a DOM of a web browser allows virtualization client 506 and proxy server 508 to take control of the DOM for different kinds of optimizations, while keeping the virtualization transparent to the web browser. In some embodiments, virtualization client 506 may be injected into web browser 504 based on standards-based (e.g., HTML or JavaScript) procedures. For example, virtualization client 506 may be injected by adding JavaScript client code (e.g., <script src="nanovisor.js"></script>) in the head section of the cached stub webpage.

At time $t_3$, web browser 504 receives the cached stub from proxy server 508. Virtualization client 506 initializes and starts to run on client device 502. Web browser 504 no longer needs to stay idle, but is unblocked from handling different tasks. For example, web browser 504 may begin to process any information included in the cached stub or to load some of the information onto memory, or may begin to initiate further downloading of dependent resources, including images, videos, audio clips, and the like.

Proxy server 508 continues to wait for the actual HTML webpage in an HTTP response message, which is expected to be sent by origin server 510 in response to the HTTP request message. At time $t_4$, origin server 510 receives the HTTP request message forwarded by proxy server 508. In response to the HTTP request message, origin server 510 processes the request message and generates the HTTP response message including the most updated HTML webpage and sends the HTTP response message to proxy server 508. At time $t_5$ and step 708, proxy server 508 intercepts the HTTP response message.

Proxy server 508 scans and processes the received webpage from origin server 510. At step 710, proxy server 508 compares the received webpage with the cached stub that has already been sent by proxy server 508 to web browser 504 to determine the differences between the two versions. At step 712, proxy server 508 determines whether the differences between the two versions can be patched/corrected safely, i.e., without any side effects or errors. At step 714, if the differences can be corrected safely, then proxy server 508 creates a set of correction/patch commands (e.g., JavaScript commands) that can be run by virtualization client 506 to correct the differences. For example, the set of commands may delete or modify the components that were previously included in the cached stub webpage. The set of commands may also add new components in the updated webpage that were not included in the cached stub webpage. At step 716, in the event that the differences cannot be corrected safely, proxy server 508 creates a set of commands that can be run by virtualization client 506 to direct web browser 504 to reload the HTML webpage. At step 718, the received webpage is used to automatically learn the cached stub corresponding to the received webpage.

At time $t_6$, proxy server 508 completes the response to web browser 504 by sending the commands and any additional information to web browser 504, such that web browser 504 may complete the rendering of the actual HTML webpage. At time $t_7$, virtualization client 506 intercepts the commands and information and executes the set of commands. By time $t_8$, either the differences between the cached stub webpage and the most updated version of the HTML webpage are corrected safely or the HTML webpage is reloaded if the differences cannot be corrected safely without any side effects or errors.

As shown in FIG. 6, using HTML streaming techniques, if a cached stub webpage is cached at proxy server 508 and sent to web browser 504, web browser 504 is unblocked at time $t'_1$ and may begin to process any information included in the cached stub webpage or load some of the information onto memory, or begin to initiate any further downloading of dependent resources, including images, videos, audio clips, and the like. The above described techniques enable more efficient use of both bandwidth and computing resources by reducing the idling time within which bandwidth and computing resources are unutilized. Without HTML streaming, the HTTP request message would have went all the way to origin server 510 and the HTTP response message would have arrived at web browser 504 at time $t'_2$, as shown by the dashed path on FIG. 6. The time difference $(t'_2-t'_1)$ is the reduced idling time of web browser 504 due to HTML streaming. The time difference allows web browser 504 a head-start in the rendering of the HTML webpage.

Figure 8:
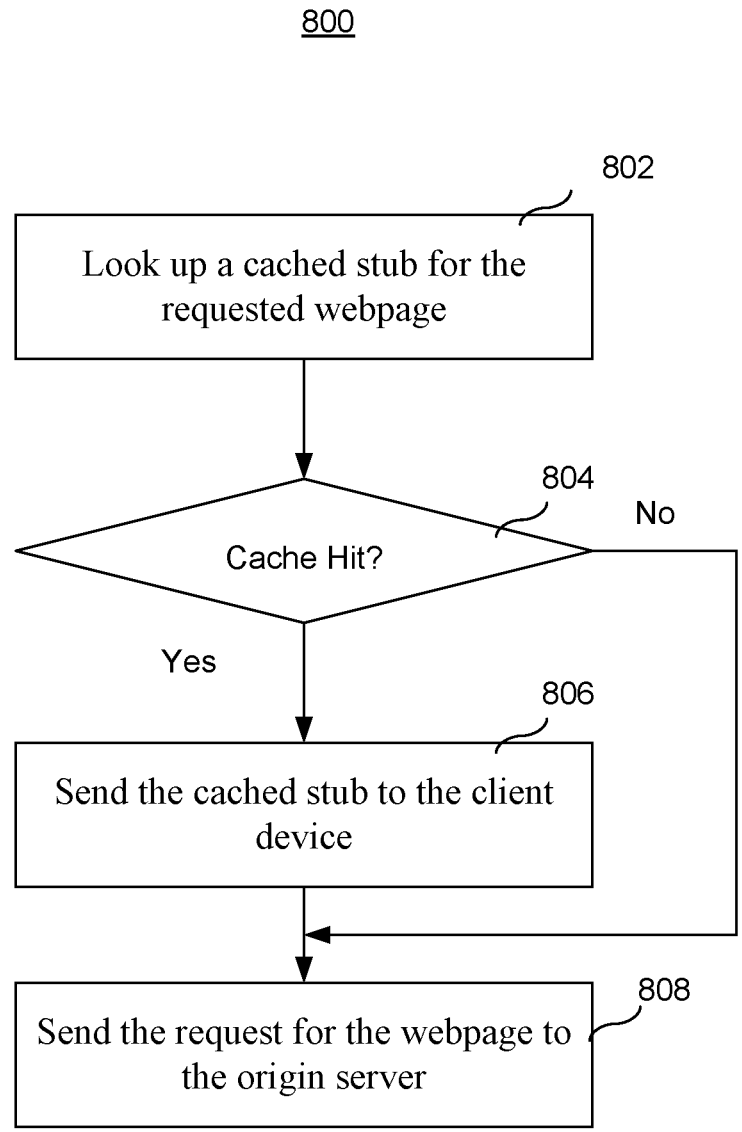
FIG. 8 illustrates an embodiment of a process 800 after the proxy server receives a request for a webpage.

FIG. 8 illustrates an embodiment of a process 800 after the proxy server receives a request for a webpage. In some embodiments, process 800 is a process performed at steps 704 and 706 of process 700 in FIG. 7.

At step 802, after receiving the HTTP request message requesting a webpage, proxy server 508 looks up a cached stub for the requested webpage in a cache. At step 804, if there is a cache hit, then at step 806, the cached stub corresponding to the requested webpage is sent to web browser 504 as the cached stub webpage. Virtualization client 506 is injected by adding JavaScript client code (e.g., <script src="nanovisor.js"></script>) in the head section of the cached stub webpage. At step 808, proxy server 508 forwards the HTTP request message to origin server 510, querying origin server 510 for the latest version of the HTML webpage. At step 804, if there is not a cache hit, then process 800 proceeds to step 808 and proxy server 508 forwards the HTTP request message to origin server 510, querying origin server 510 for the latest version of the HTML webpage.

In some embodiments, chunked transfer encoding is used to deliver the cached stub webpage sent at step 806 of process 800 first and then subsequently any updated or additional information extracted from the updated webpage from origin server 510. Chunked transfer encoding is a data transfer mechanism in version 1.1 of HTTP wherein data is sent in a series of "chunks". The mechanism uses the Transfer-Encoding HTTP header in place of the Content-Length header, which the protocol would otherwise require. Because the Content-Length header is not used, the sender does not need to know the length of the content before it starts transmitting a response to the receiver; senders can begin transmitting dynamically-generated content before knowing the total size of that content. The size of each chunk is sent right before the chunk itself, so that the receiver can tell when it has finished receiving data for that chunk. The data transfer is terminated by a final chunk of length zero.

For example, proxy server 508 may use chunked transfer encoding to send the cached stub corresponding to the requested webpage in a series of one or more initial "chunks" to web browser 504. Any updated or additional information and any commands to correct the differences between the sent version and the updated version of the webpage may be sent to web browser 504 in a series of subsequent "chunks." When all the updated information and commands have been sent, the data transfer is terminated by a final chunk of length zero. For example, proxy server 508 may send an initial "chunk" that includes the head section and the <body> tag of the HTML webpage file. The head section includes the cached stub, which includes the cacheable components, e.g., static and shared non-unique components, of the HTML webpage. The head section also includes the injected virtualization client code. After the updated webpage file is received from origin server 510, proxy server 508 may send a subsequent "chunk" (or subsequent "chunks") that includes the actual content of the body section, any updated information and any correction commands, followed by the </body> and </html> tags.

The cached stub of a webpage should include components that are empirically determined to be safe to be served to web browser 504 ahead of time. One way to guarantee that the cached stub is safe is to work with the content provider. The content provider may identify the static components. The content provider may also move the dynamic components out of the head section. However, this method is cumbersome and non-scalable.

In some embodiments, the cached stub is automatically and empirically learned by the system. For any HTML webpage, a cached stub is learned during a learning period. In some embodiments, the learning is a continuous process that repeats after a predetermined period of time. In some embodiments, the learning is a continuous process that repeats after a predetermined number of webpage requests/responses have been sent/received. During a learning period, proxy server 508 observes which components in the webpage remain common across multiple requests, and which components are changing and how. In some embodiments, proxy server 508 observes the common components in the head section of the webpage only: only static common components in the head section are included in the cached stub and sent to web browser 504 ahead of time. In some embodiments, proxy server 508 may observe the common components in the body section as well. In the latter case, the computational overhead is higher, but more static common components in the webpage may be delivered ahead of time. At the end of the learning period, the stub is learned and it can be stored in the cache, replacing an older version of the stub learned in the previous learning period.

Figure 9:
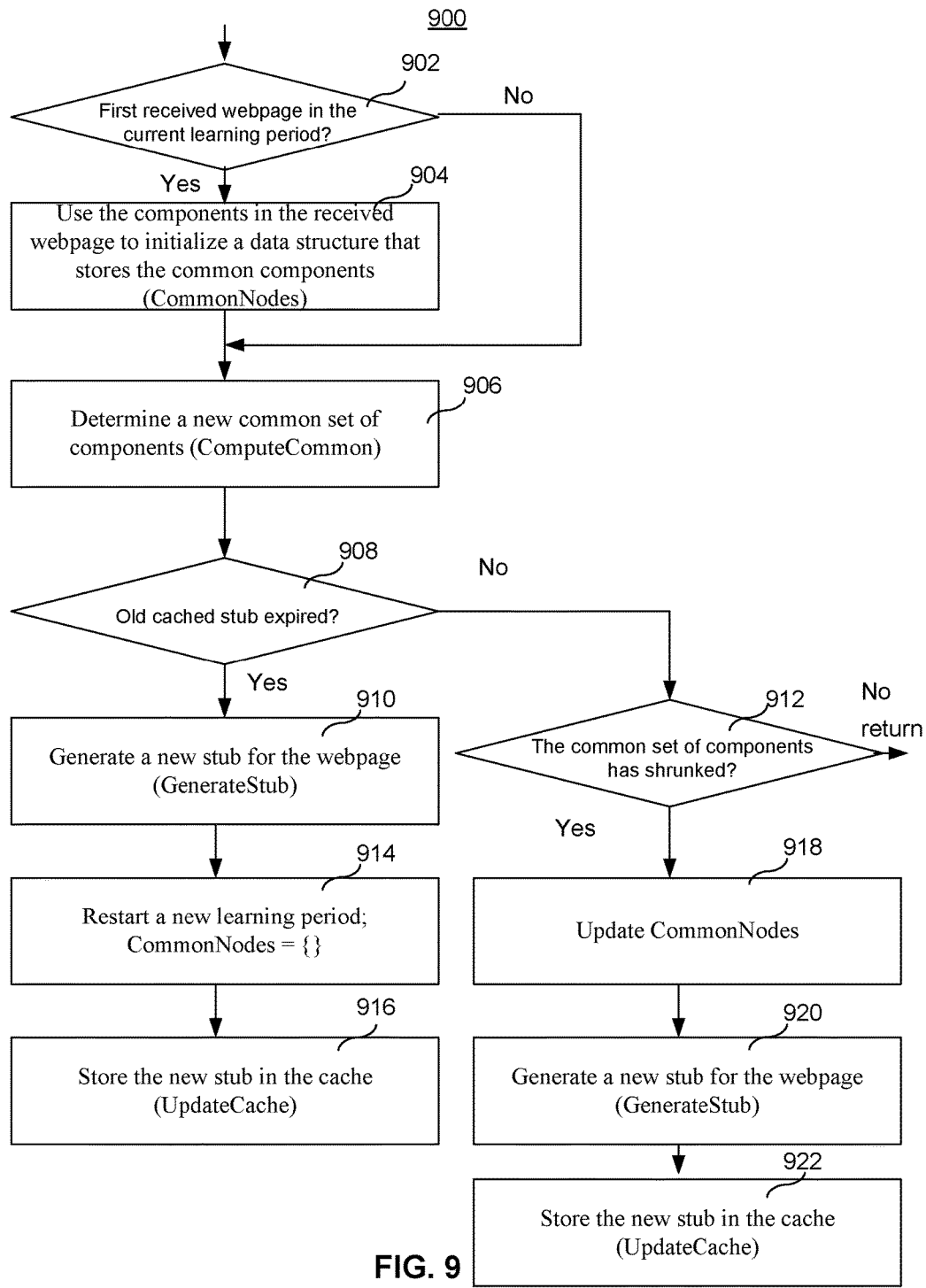
FIG. 9 illustrates an embodiment of a process 900 for learning a cached stub based on the received webpage from the origin server.

FIG. 9 illustrates an embodiment of a process 900 for learning a cached stub based on the received webpage from the origin server. In some embodiments, process 900 is a process performed during step 718 of process 700 in FIG. 7.

At step 902, it is determined whether the received webpage is the first one received within the current learning period. At step 904, if the received webpage is the first one, then the components in the received webpage are used to initialize a data structure named CommonNodes. The data structure CommonNodes stores the common static components of the webpage found within a learning period thus far. Process 900 then proceeds to step 906. If the received webpage is not the first one received within the current learning period, then process 900 proceeds to step 906.

At step 906, a new set of common static components of the webpage found within the current learning period is determined. $New_{CN}$ is the data structure used to store the new set of common static components of the webpage within the current learning period. Although a new set of common components is now available, $New_{CN}$ is only used to update the cached stub when one of two criteria is satisfied. One criterion is that the learning period is complete and that the previous cached stub has expired. At step 908, it is determined whether the learning period is complete. If the learning period is complete at step 910, then a new cacheable stub for the webpage is generated. At step 914, a new learning period is restarted. The data structure CommonNodes is reset to empty. At step 916, the generated cacheable stub obtained at step 910 is stored into the cache.

A second criterion is that the data structure CommonNodes becomes unstable. CommonNodes is unstable when the new set of common static components ($New_{CN}$) is smaller in size (number of components) than the size of CommonNodes. At step 912, it is determined whether the data structure CommonNodes becomes unstable. If it is true, at step 918, the new set of common static components ($New_{CN}$) is saved into the data structure CommonNodes, replacing its previous contents. At step 920, a new cacheable stub for the webpage is generated. At step 922, the generated cacheable stub obtained at step 910 is stored into the cache.

As mentioned above, the cached stub of a webpage should include components that are safe to be served to web browser 504 ahead of time. The stub should not include any user-specific information. For example, Meta data in the head section may include user-specific information, such as a username. Such information should be excluded from the cached stub because user-specific information should not be sent to other users. Stale versions of any changing component should be excluded from the cached stub.

In some situations, a script in a webpage that remains common across multiple requests may still be unsafe to be pre-executed by the web browser and is therefore excluded from the cached stub. A script can change the underlying DOM as the script is being executed. Changing the DOM may in turn impact the execution of other subsequent scripts. Therefore, if a script is not common across requests, then all subsequent scripts in the same webpage are removed from the stub.

For example, suppose one instance of a webpage has four JavaScripts, JS1, JS2, JS3, and JS4, while other instances of the same webpage have only three scripts, JS1, JS3, and JS4. Since the changing script JS2 may change the underlying DOM, and JS3 and JS4 may have dependencies upon those changes, JS3 and JS4 must be excluded from the cached stub even if JS3 and JS4 are consistently found on all instances of the webpage.

In some situations, a component of a webpage may not be completely identical across multiple requests but it is sufficiently similar across multiple requests that it can be included into the cached stub. For example, a component of a webpage may have the same number and types of attributes across multiple requests but the value of one of the attributes may change over time. If such a component were to be included in the cached stub, then the component would need to be monitored by the system to ensure that the changing portion of the component can be corrected safely, without causing any errors or side-effects. In some embodiments, the component is monitored by the system by embedding a "placeholder" for the possibly changing portion of the component and activating a function of the virtualization client (also referred to as a nanovisor) to intercept and watch for any access to the placeholder. If the watched portion of the component of the most recently received webpage has indeed changed, and the intercepting function has previously intercepted at least one access to the placeholder (e.g., by a cached script), then it is determined that the change cannot be safely corrected and that a reloading of the webpage by the virtualization client is required to ensure that the webpage is re-created correctly. The goal is that any corrections should be completely transparent. Once all the corrections are performed by the correcting commands, the resulting webpage should be exactly as if it was fetched directly from origin server 510.

Figure 10:
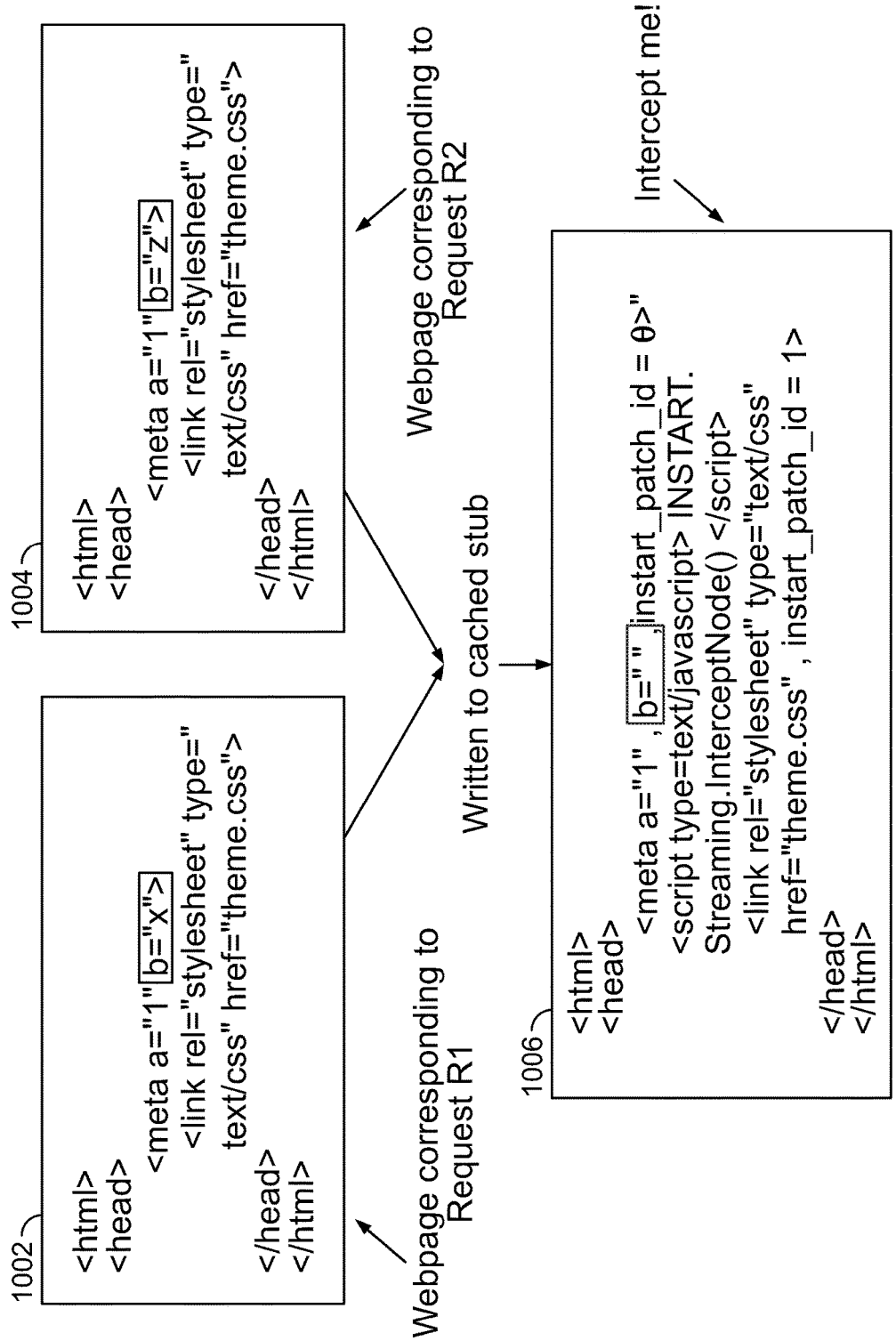
FIG. 10 illustrates an example of embedding a placeholder for a portion of a component and activating a virtualization client function to intercept and watch for any access to the placeholder.

FIG. 10 illustrates an example of embedding a placeholder for a portion of a component and activating a virtualization client function to intercept and watch for any access to the placeholder. Within a single learning period, two instances of the same webpage (webpage 1002 and webpage 1004) are received. Webpage 1002 is received by proxy server 508 in response to a request R1. Webpage 1004 is received by proxy server 508 in response to a request R2 As shown in webpage 1002 and webpage 1004, the link element stays unchanged but the value of attribute b of the meta element changes from "x" to "z." After the learning period is over, a cached stub 1006 is stored in the cache. The link element is stored in the cached stub 1006 without a placeholder. The meta element is also included in the cached stub 1006, but the changing attribute value is removed and a placeholder for the value of attribute b is added. The placeholder in this example is an empty string. In addition, a virtualization client function InterceptNode( ) is invoked to intercept and watch for any access to the placeholder by a script. If an access to the placeholder by a script is intercepted, then a reloading of the webpage is triggered.

Figure 11:
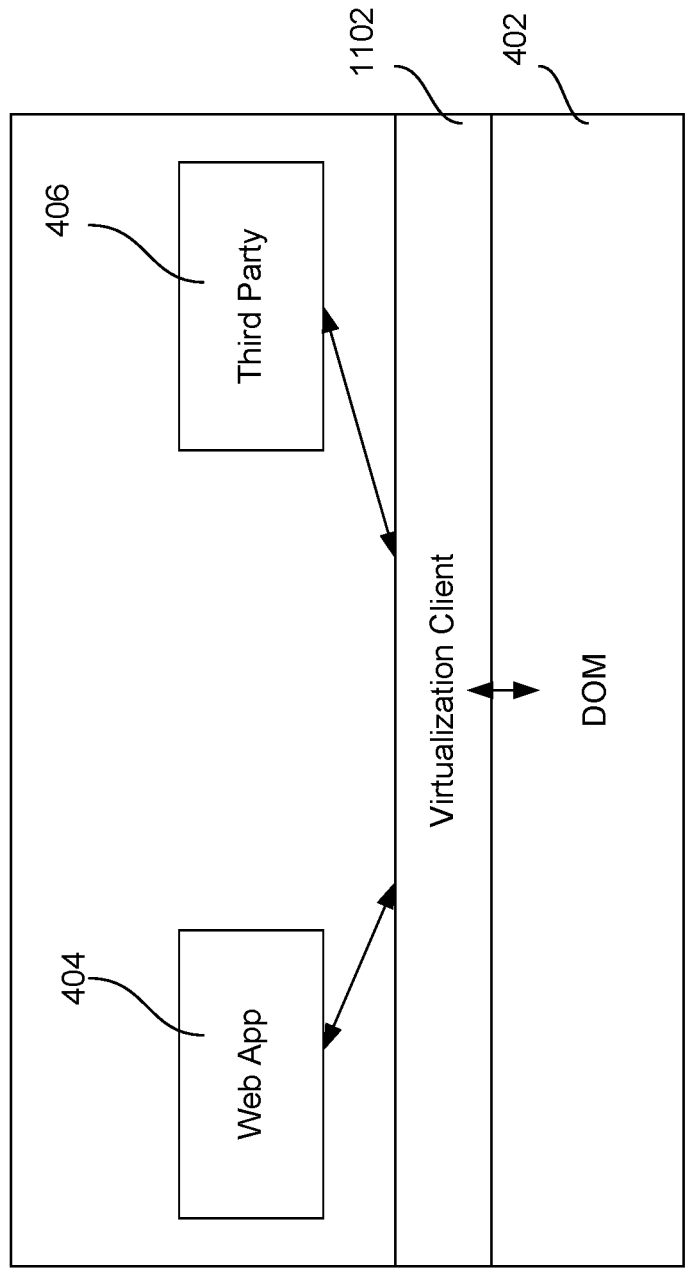
FIG. 11 illustrates a DOM virtualization layer/client above DOM 402.

The virtualization client is able to intercept and watch for any access to the placeholder on the client side because the virtualization client is a DOM virtualization layer/client added on top of the DOM. FIG. 11 illustrates a DOM virtualization layer/client above DOM 402. Virtualization client 1102 may intercept the DOM APIs that pass information or instructions between the DOM 402 and different types of scripts. Virtualization client 1102 may supplant an intercepted DOM API with a new DOM API. For example, the new DOM API may selectively block the intercepted DOM API based on different criteria. The new DOM API may also modify the intercepted DOM API and pass a modified version of the intercepted DOM API to the DOM or the caller/user. The new DOM API may also trigger an alert in response to an intercepted DOM API.

Figure 12:
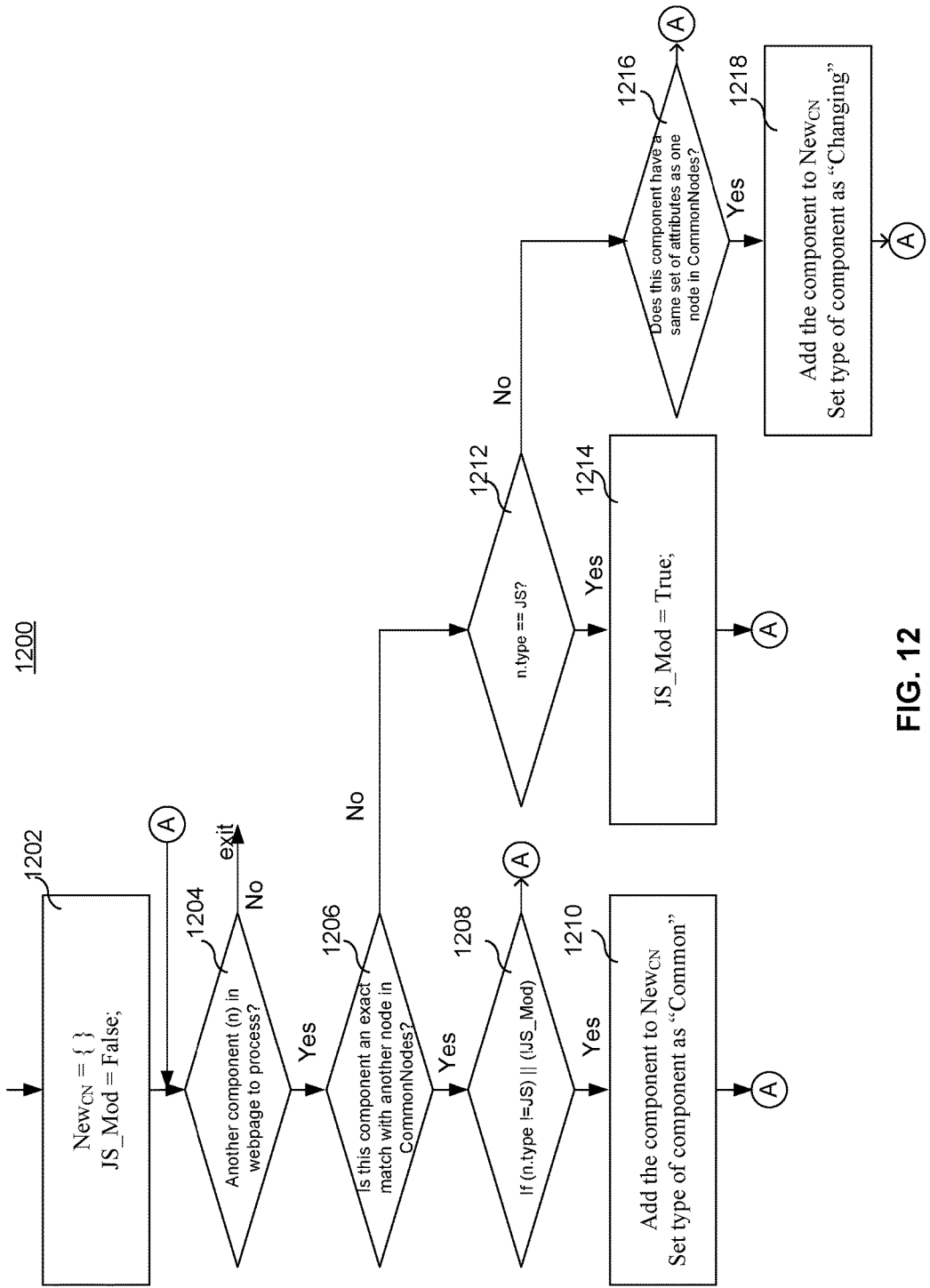
FIG. 12 illustrates an embodiment of a process 1200 for determining a new common set of components of a webpage that are safe to be included in the cacheable stub.

FIG. 12 illustrates an embodiment of a process 1200 for determining a new common set of components of a webpage that are safe to be included in the cacheable stub. In some embodiments, process 1200 is a process (ComputeCommon) performed during step 906 of process 900 in FIG. 9.

At step 1202, New$_{CN}$ is reset to empty. JS_Mod is a flag that is set to true if a script in the webpage is found to be non-common across multiple requests. JS_Mod is initialized to false at step 1202. Next, each of the components in the received webpage is processed in a loop. The top of the loop is shown as "A" in process 1200. At step 1204, it is determined whether there is another component (n) in the received webpage to process. If there is an additional component, then process 1200 proceeds to step 1206; otherwise, process 1200 terminates.

At step 1206, it is determined whether this component n is an exact match with another node in CommonNodes. If it is an exact match, process 1200 proceeds to step 1208. At step 1208, it is determined if the exactly matched component n is not a script or if JS_Mod has not been set. If the result at 1208 is false, then the component is not saved and the process returns back to the top of the loop (A) to process additional components, if any. In this case, the component is not saved because it is a script that follows another script that has been modified or deleted. If the exactly matched component n is not a script, then process 1200 proceeds to step 1210. If the exactly matched component n is a script, but JS_Mod is false, then process 1200 also proceeds to step 1210. At step 1210, the component is added to New$_{CN}$ and marked as "Common," indicating that the exactly matched component n is saved as a common node "as is." After step 1210, process 1200 returns back to the top of the loop (A) to process additional components, if any.

At step 1206, if component n is not an exact match with another node in CommonNodes, then process 1200 proceeds to step 1212. At step 1212, it is determined whether component n is a script. If component n is a script, then JS_Mod is set to true at step 1214. After step 1214, process 1200 returns back to the top of the loop (A) to process additional components, if any. If component n is not a script, then process 1200 proceeds to step 1216.

At step 1216, it is determined whether component n has the same set of attributes as one node c in CommonNodes.

It is further determined whether the component n has the attributes "id," "name," and "type" having the same values as those in node c. If the above conditions are met, then process 1200 proceeds to step 1218. At step 1218, the component n is added to New$_{CN}$ and the component is marked as "Changing," indicating that the component n is saved as a common node but it has at least an attribute that changes its value over time. A placeholder will later be added to the component if it is marked as "Changing." After step 1218, process 1200 returns back to the top of the loop (A) to process additional components, if any.

Figure 13:
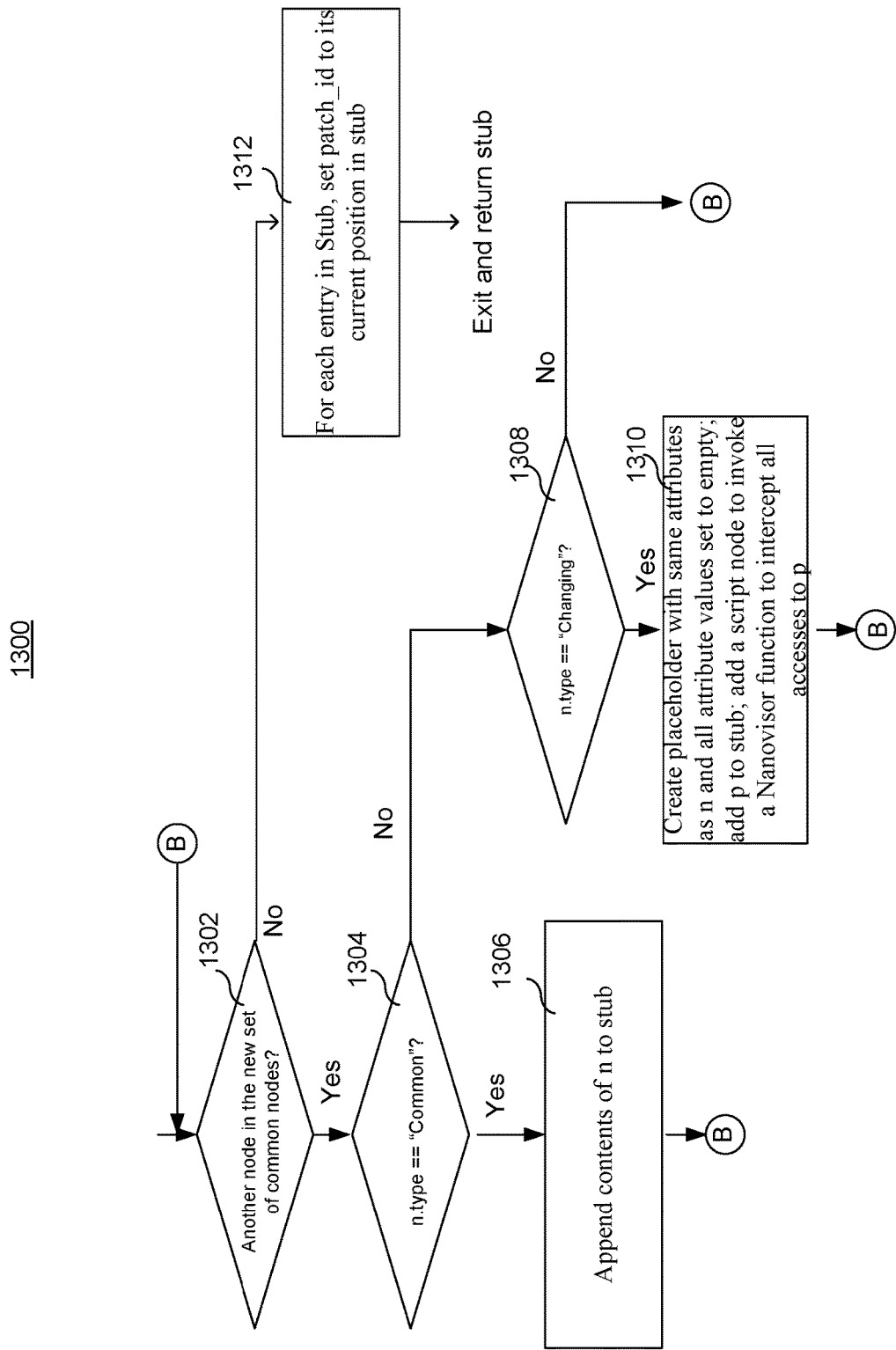
FIG. 13 illustrates an embodiment of a process 1300 for generating a cacheable stub for a webpage.

FIG. 13 illustrates an embodiment of a process 1300 for generating a cacheable stub for a webpage. In some embodiments, process 1300 is a process (GenerateStub) performed during step 910 or step 920 of process 900 in FIG. 9.

In process 1300, first, each of the nodes in the new set of common nodes is processed in a loop. The top of the loop is shown as "B" in process 1300. At step 1302, it is determined whether there is another node in the new set of common nodes to process. If there is an additional node, then process 1300 proceeds to step 1304; otherwise, process 1300 proceeds to step 1312.

At step 1304, it is determined whether this node n is marked as "Common." If it is marked as "Common," then the contents of n are appended to the stub at step 1306. Process 1300 then returns back to the top of the loop (B) to process additional nodes, if any. Otherwise, at 1308, it is determined if the node is marked as "Changing." If false, process 1300 returns back to the top of the loop (B) to process additional nodes, if any. If true at step 1310, a placeholder is created with the same attributes as n and all the attribute values are set to empty. The placeholder is added to the stub. In addition, a script node is added to invoke a nanovisor function to intercept all accesses to the placeholder. After step 1310, process 1300 returns back to the top of the loop (B) to process additional nodes, if any.

At step 1312, all nodes in the new set of common nodes have been processed. For each entry in the stub, the patch_id of the entry is set to its current position in the stub. After step 1312, the stub is returned and the process is complete.

Figure 14:
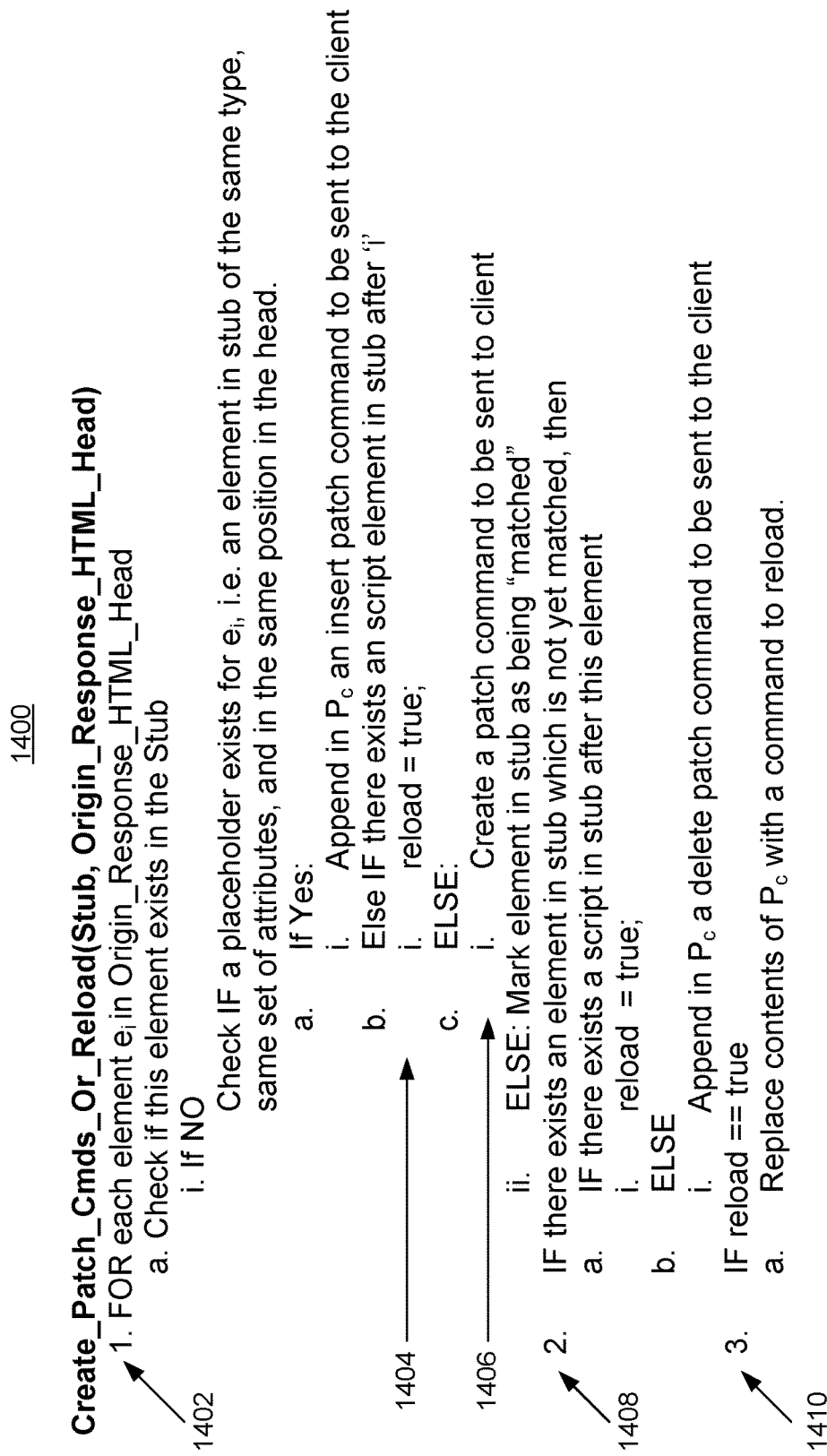
FIG. 14 illustrates an embodiment of a process 1400 for creating a set of commands to make corrections to the cached stub or to reload the webpage if the cached stub cannot be corrected safely.

FIG. 14 illustrates an embodiment of a process 1400 for creating a set of patch/correction commands to make corrections to the cached stub or to reload the webpage if the cached stub cannot be corrected safely. In some embodiments, process 1400 is a process (Create_Patch_Cmds_Or_Reload) performed during steps 710, 712, 714, and 716 of process 700 in FIG. 7.

In process 1400, first, each of the components in the received webpage is processed in a FOR loop (see 1402). For each component i, it is determined whether the component exists in the cached stub. If the component exists in the stub, then the matching component in the stub is marked as "matched" and the next component is processed. Otherwise, it is determined whether the component has a placeholder. For example, it is determined whether the component has a placeholder component in the stub with the same type, the same set of attributes, and located at the same position i within the stub as the component is located within the received webpage. If there is such a placeholder component in the stub, then a patch/correction command is appended to Pc, a data structure that stores the correction commands to be sent to the client side. The placeholder is then replaced by the updated received value. If there is not such a placeholder, it is determined if there is a script element in the stub at position 'i' or after position 'i'. If such a script element exists, then it is unsafe to patch the current component and the flag reload is set to true (scenario 1404); it is unsafe to insert a new component before a script because the script might have already tried to access the component. If there is not a script element in the stub after position 'i', then a patch/correction command is created to be sent to the web browser (scenario 1406).

At 1408, all the components in the received webpage have been processed by the FOR loop, and it is determined whether there is a component in the stub that has yet to be matched. If there is a script in the stub after the unmatched component in the stub, then the flag reload is set to true. It is unsafe to delete this component from the stub because a script that follows it might have already tried to access the missing component. Therefore, the webpage should be reloaded. If there is no script in the stub after the unmatched component in the stub, then a "delete" patch command is appended to Pc to be sent to the client side.

At 1410, if the flag reload is true, then the contents of Pc are replaced with a reload patch command. After 1410, the patch commands in Pc are sent to the client side.

Figure 15:
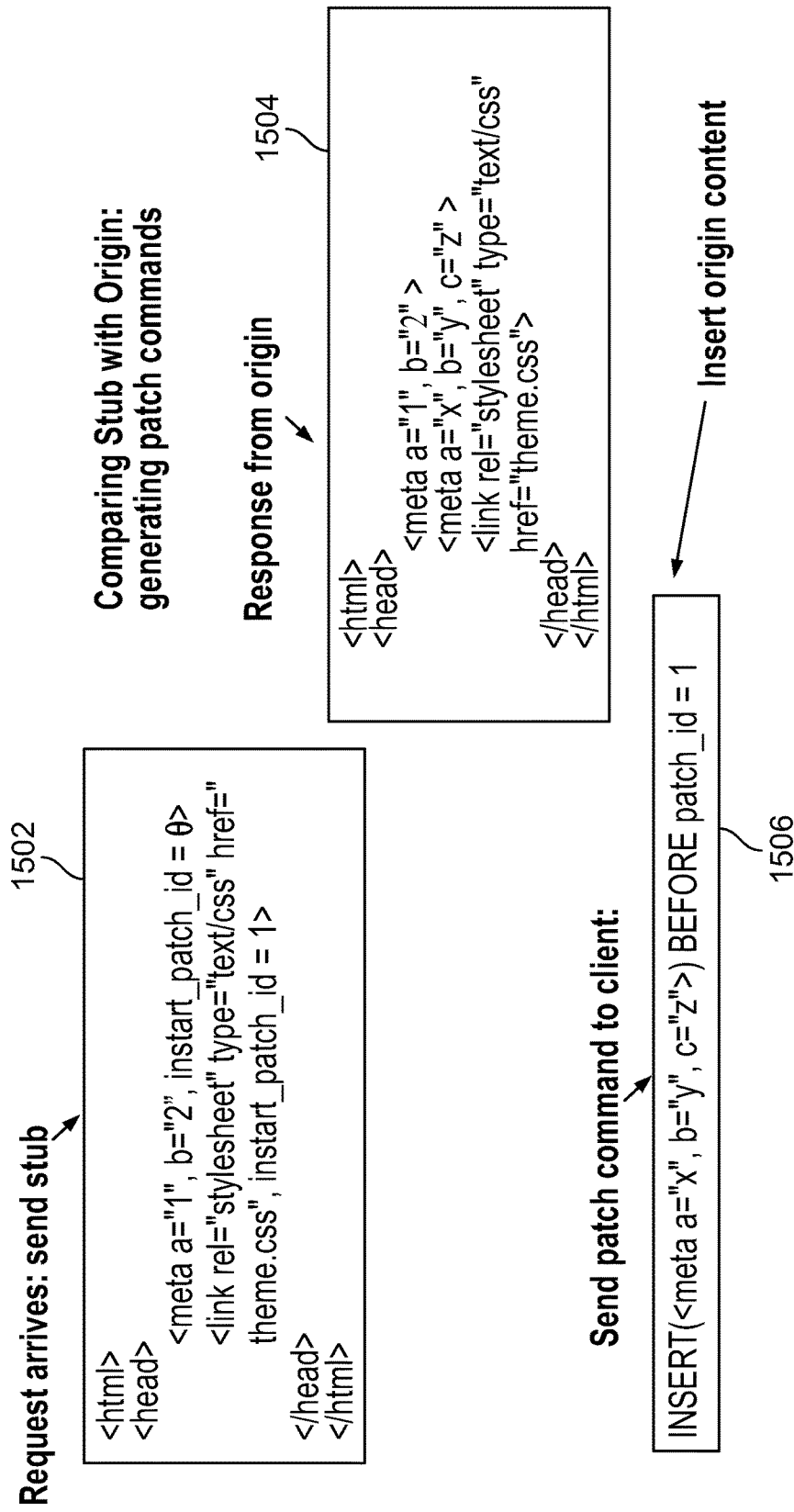
FIG. 15 illustrates an example of determining a correction command for correcting a cached stub that has been served to a web browser.

FIG. 15 illustrates an example of determining a correction command for correcting a cached stub that has been served to a web browser.

As shown in FIG. 15, a stub 1502 for a webpage was sent by proxy server 508 to web browser 504 in response to a webpage request. Cached stub 1502 includes a meta element and a link element. The meta element was assigned a patch_id=0 and the link element was assigned a patch_id=1. The patch_id is used to identify the position of a component within the cached stub.

An updated webpage 1504 is later received from origin server 510 by proxy server 508. Updated webpage 1504 includes two meta elements and one link element. The second meta element in updated webpage 1504 is new and therefore was not included in the stub previously sent to web browser 504. Since the new meta element is not followed by any script element, it is safe for proxy server 508 to instruct virtualization client 506 to insert the new meta element into the DOM. Accordingly, an "INSERT" patch command 1506 is sent to the client side, which is handled by scenario 1406 of process 1400 in FIG. 14. Patch command 1506 invokes virtualization client 506 to insert the new meta element into the DOM before patch_id=1 (i.e., after the first meta element (patch_id=0) but before the link element (patch_id=1)). Virtualization client 506 may then use a DOM API to insert the new meta element into the correct position in the DOM tree.

Figure 16:
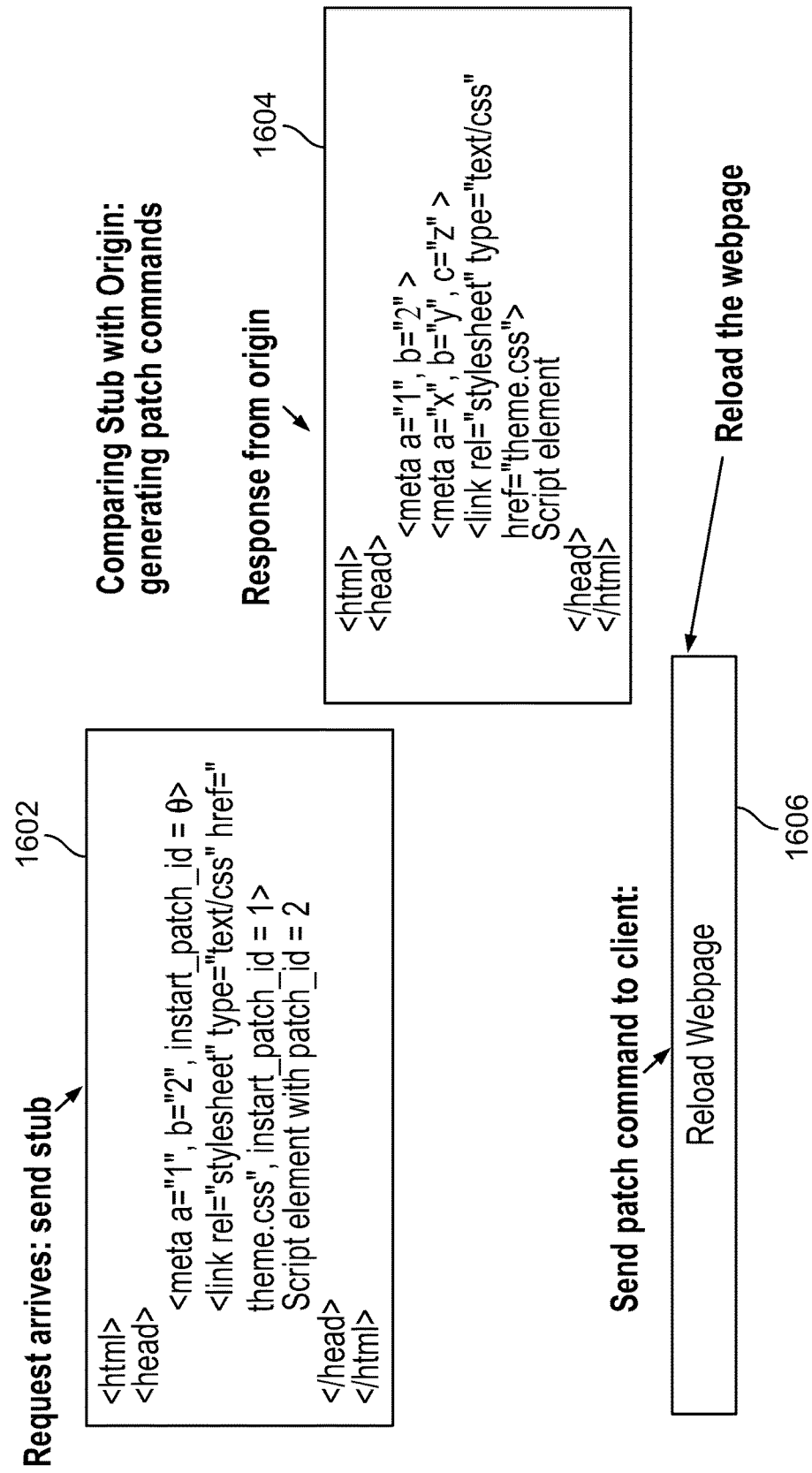
FIG. 16 illustrates another example of determining a correction command for correcting a cached stub that has been served to a web browser.

FIG. 16 illustrates another example of determining a correction command for correcting a cached stub that has been served to a web browser.

As shown in FIG. 16, a stub 1602 for a webpage was sent by proxy server 508 to web browser 504 in response to a webpage request. Cached stub 1602 includes a meta element, a link element, and a script element. The meta element was assigned a patch_id=0, the link element was assigned a patch_id=1, and the script element was assigned a patch_id=2. The patch_id is used to identify the position of a component within the cached stub.

An updated webpage 1604 is later received from origin server 510 by proxy server 508. Updated webpage 1604 includes two meta elements, one link element, and one script element. The second meta element in updated webpage 1604 is new and therefore was not included in the stub previously sent to web browser 504. Since the new meta element is followed by a script element, it is unsafe for proxy server 508 to instruct virtualization client 506 to insert the new meta element into the DOM. Accordingly, a "Reload" patch command 1606 is sent to the client side, which is handled by scenario 1404 of process 1400 in FIG. 14. Patch command 1606 invokes virtualization client 506 to cause a reload of the webpage.

The duration of the learning period for learning a cached stub of a webpage is a parameter that can be fine-tuned for increased performance. A longer learning period allows the proxy server to observe many different instances of the same webpage sent in response to different requests that are sent under different conditions, e.g., from different users, from different geographic locations, and at different times. When the learning period captures sufficient request diversity, the proxy server may more accurately include the cacheable components in the cached stub and exclude the non-cacheable components from the cached stub. However, the tradeoff of having a longer learning period is that the system will be less agile in adapting to any changes of the webpage made by the publisher/origin server.

On the other hand, if the learning period is too short, the learned cached stub may be unsafe, which may lead to frequent reloading of the webpage. Unfortunately, it may not be possible to determine a minimum threshold for the learning period in advance. To illustrate this point further, consider an origin server that has two versions of the same webpage—version one being served to 5% of the users and version two being served to the remaining 95% of the users. Statistically speaking, in order to avoid creating a stub before the proxy server has a chance to observe the responses sent to the 5% of the users, i.e., those requesting version one of the webpage, the learning period should be long enough to observe at least 100/5=20 responses. Since the percentage breakdown of the different versions of any given webpage is not known a priori, a minimum threshold for the learning period cannot be determined in advance by the proxy server.

Furthermore, a webpage may also go through certain phases during which a cached stub cannot be constructed safely. During these phases, a cached stub should not be served to the web browser ahead of time: HTML streaming should be switched off for a period of time and relearning attempted at a later time, when a cached stub can be more safely constructed. Therefore, improved techniques for adaptively adjusting the duration of the learning period for learning a cached stub of a webpage are desirable.

In some embodiments, the duration of the learning period for learning a cached stub of a webpage is dynamically adapted. The proxy server may monitor the frequency of occurrence of reloading of the webpage. For example, within a window measured by a number of requests most recently observed, the proxy server determines the percentage of requests within the window resulting in a reloading of the webpage and the reasons why the webpage was reloaded. If the reloading of the webpage was triggered by the client side (i.e., the reloading is triggered when the nanovisor watch function has intercepted an illegal access of a placeholder component in a stub), then the reloading cannot be reduced by increasing the learning period. Conversely, if the reloading of the webpage was triggered by the proxy server, then the reloading may be caused by a learning period that is too short to capture sufficient request diversity, and thus the reloading can be reduced by increasing the learning period.

Accordingly, if the frequency/percentage of requests resulting in a reloading of the webpage triggered by the client side exceeds a predetermined threshold, then HTML streaming is switched off for a period of time such that a cached stub is no longer sent in advance to the web browser. The relearning may be attempted at a later time when a cached stub can be constructed more safely. If the percentage of requests resulting in a reloading of the webpage triggered by the proxy server exceeds a predetermined threshold, then the cached stub is reset and HTML streaming is disabled. Learning is restarted with a longer learning period (e.g., by scaling the previous learning period by a factor). Increasing the learning period enhances the possibility of capturing the diversity of user requests and creating a safe, reload-free stub. The scaling of the learning period by an increasing factor is repeated until the percentage of requests resulting in a reloading of the webpage falls below the predetermined threshold. For example, the learning period may be scaled by a factor of 2, 4, 8, and so forth until the reloading percentage drops below the predetermined threshold or the cache TTL is reached. At this point, the learning period may be reset back to the default duration again.

Dynamically adapting the learning period as described above has many advantages. The learning period can be automatically optimized for different webpages and automatically adjusted based on the frequency at which updates of a webpage is applied. The learning process becomes more agile, thereby increasing the effectiveness of the entire system. Furthermore, without the need for manual configurations, the system becomes more scalable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of speeding up the delivery of a dynamic webpage, comprising:
   receiving from a client device a request for a webpage, the webpage including one or more components;
   sending to the client device a cached stub in response to the request, wherein the cached stub includes a placeholder replacing at least a portion of a first component of the webpage; and
   injecting a script in the cached stub that intercepts any access to the placeholder by a second script running on the client device.

2. The method of claim 1, wherein the script causes a reloading of the webpage in response to an interception of an access to the placeholder.

3. The method of claim 1, further comprising:
   empirically determining that the portion of the first component replaced by the placeholder changes across multiple requests for the webpage; and
   empirically determining that a second portion of the first component not replaced by a placeholder stays unchanged across multiple requests for the webpage.

4. The method of claim 1, wherein the portion of the first component replaced by the placeholder corresponds to a value of an attribute.

5. The method of claim 1, wherein the placeholder replacing the at least a portion of the first component of the webpage comprises an empty string.

6. The method of claim 1, further comprising:
   forwarding the request for the webpage to an origin server;
   receiving the webpage from the origin server;
   extracting an updated value of the portion of the first component from the webpage received from the origin server; and sending an instruction to replace the placeholder with the extracted updated value.

7. The method of claim 1, wherein the script invokes a function of a virtualization client, and wherein the virtualization client includes a DOM (Document Object Model) virtualization layer added on top of a DOM.

8. The method of claim 1, wherein the cached stub includes only components that are located in the head section of the webpage.

9. A system for speeding up the delivery of a dynamic webpage, comprising:
a processor configured to:
receive from a client device a request for a webpage, the webpage including one or more components;
send to the client device a cached stub in response to the request, wherein the cached stub includes a placeholder replacing at least a portion of a first component of the webpage; and
inject a script in the cached stub that intercepts any access to the placeholder by a second script running on the client device; and
a memory coupled to the processor and configured to provide the processor with instructions.

10. The system of claim 9, wherein the script causes a reloading of the webpage in response to an interception of an access to the placeholder.

11. The system of claim 9, wherein the processor is further configured to:
empirically determine that the portion of the first component replaced by the placeholder changes across multiple requests for the webpage; and
empirically determine that a second portion of the first component not replaced by a placeholder stays unchanged across multiple requests for the webpage.

12. The system of claim 9, wherein the portion of the first component replaced by the placeholder corresponds to a value of an attribute.

13. The system of claim 9, wherein the placeholder replacing the at least a portion of the first component of the webpage comprises an empty string.

14. The system of claim 9, wherein the processor is further configured to:
forward the request for the webpage to an origin server;
receive the webpage from the origin server;
extract an updated value of the portion of the first component from the webpage received from the origin server; and
send an instruction to replace the placeholder with the extracted updated value.

15. The system of claim 9, wherein the script invokes a function of a virtualization client, and wherein the virtualization client includes a DOM (Document Object Model) virtualization layer added on top of a DOM.

16. The system of claim 9, wherein the cached stub includes only components that are located in the head section of the webpage.

17. A computer program product for speeding up the delivery of a dynamic webpage, the computer program product being embodied in a non-transitory computer readable storage medium and comprising computer instructions for:
receiving from a client device a request for a webpage, the webpage including one or more components;
sending to a client device a cached stub in response to the request, wherein the cached stub includes a placeholder replacing at least a portion of a first component of the webpage; and
injecting a script in the cached stub that intercepts any access to the placeholder by a second script running on the client device.

18. The computer program product recited in claim 17, wherein the script causes a reloading of the webpage in response to an interception of an access to the placeholder.

19. The computer program product recited in claim 17, further comprising computer instructions for:
empirically determining that the portion of the first component replaced by the placeholder changes across multiple requests for the webpage; and
empirically determining that a second portion of the first component not replaced by a placeholder stays unchanged across multiple requests for the webpage.

20. The computer program product recited in claim 17, further comprising computer instructions for:
forwarding the request for the webpage to an origin server;
receiving the webpage from the origin server;
extracting an updated value of the portion of the first component from the webpage received from the origin server; and
sending an instruction to replace the placeholder with the extracted updated value.

\* \* \* \* \*